(12) United States Patent
Pan et al.

(10) Patent No.: US 8,990,445 B2
(45) Date of Patent: Mar. 24, 2015

(54) CONTROL CHIP FOR COMMUNICATING WITH WIRED CONNECTION INTERFACE BY USING ONE CONFIGURABLE PIN SELECTIVELY SERVING AS INPUT PIN OR OUTPUT PIN

(75) Inventors: Ching-Gu Pan, Hsinchu (TW); Huai-Yuan Feng, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 116 days.

(21) Appl. No.: 13/411,635

(22) Filed: Mar. 5, 2012

(65) Prior Publication Data
US 2013/0229221 A1  Sep. 5, 2013

(51) Int. Cl.
G06F 3/00 (2006.01)
G06F 15/173 (2006.01)

(52) U.S. Cl.
CPC *G06F 15/17343* (2013.01); *G05B 2219/21012* (2013.01)
USPC ............................................. 710/12; 710/20

(58) Field of Classification Search
CPC ................. G06B 2219/21012; G06F 15/17343
USPC .......................................................... 710/12
See application file for complete search history.

(56) References Cited

U.S. PATENT DOCUMENTS

| 6,825,689 B1 * | 11/2004 | Snyder | 326/41 |
| 7,356,451 B2 * | 4/2008 | Moon et al. | 703/19 |
| 7,817,586 B2 * | 10/2010 | Hsieh | 370/282 |
| 2007/0130402 A1 * | 6/2007 | Olson | 710/62 |
| 2008/0222703 A1 * | 9/2008 | Mantani | 726/3 |
| 2011/0050734 A1 * | 3/2011 | Syed | 345/690 |
| 2011/0068736 A1 * | 3/2011 | Chartier et al. | 320/107 |

* cited by examiner

*Primary Examiner* — Henry Tsai
*Assistant Examiner* — John Roche
(74) *Attorney, Agent, or Firm* — Winston Hsu; Scott Margo

(57) ABSTRACT

A control chip includes a configurable pin and a control logic. The configurable pin is arranged for coupling a first pin and a second pin of a high-definition multimedia interface (HDMI) connector. The control logic is arranged for controlling the configurable pin to switch between a first operation mode and a second operation mode. The configurable pin serves as an input pin when operating in the first operation mode, and the configurable pin serves as an output pin when operating in the second operation mode. For example, the input pin is arranged for receiving a power supply signal derived from a +5V power signal received by the first pin, and the output pin is arranged for outputting a control signal for controlling hot plug detection (HPD).

20 Claims, 5 Drawing Sheets

| PIN | Signal Assignment |
|---|---|
| 1 | TMDS Data2+ |
| 3 | TMDS Data2− |
| 5 | TMDS Data1 Shield |
| 7 | TMDS Data0+ |
| 9 | TMDS Data0− |
| 11 | TMDS Clock Shield |
| 13 | CEC |
| 15 | SCL |
| 17 | DDC/CEC Ground |
| 19 | Hot Plug Detect |

| PIN | Signal Assignment |
|---|---|
| 2 | TMDS Data2 Shield |
| 4 | TMDS Data1+ |
| 6 | TMDS Data1− |
| 8 | TMDS Data0 Shield |
| 10 | TMDS Clock+ |
| 12 | TMDS Clock− |
| 14 | Reserved(N.C. on device) |
| 16 | SDA |
| 18 | +5V Power |

FIG. 1 RELATED ART

CONTROL CHIP FOR COMMUNICATING WITH WIRED CONNECTION INTERFACE BY USING ONE CONFIGURABLE PIN SELECTIVELY SERVING AS INPUT PIN OR OUTPUT PIN

BACKGROUND

The disclosed embodiments of the present invention relate to reducing a pin count of a chip, and more particularly, to a control chip for communicating with a wired connection interface by using a configurable pin selectively serving as an input pin (e.g., a pin used for receiving a power supply signal for connection detection) or an output pin (e.g., a pin used to output a control signal for controlling hot plug detection).

HDMI (high-definition multimedia interface) is a compact audio/video interface for transmitting digital data. For example, an HDMI source device (e.g., a set-top box, an optical disc player, a video game console, or a personal computer) is connected to an HDMI sink device (e.g., a video projector, a television, or a computer monitor) via an HDMI cable. In general, each of the HDMI source device and HDMI sink device is equipped with at least one HDMI connector (i.e., at least one HDMI port). FIG. 1 is a diagram illustrating an exemplary pin assignment of a conventional HDMI connector. A conventional control chip of an HDMI transmitter located at the HDMI source device is required to have dedicated pins coupled to pins of each HDMI connector, respectively. Similarly, a conventional control chip of an HDMI receiver located at the HDMI sink device is required to have dedicated pins coupled to pins of each HDMI connector, respectively. Taking an HDMI connector with the exemplary pin assignment shown in FIG. 1 for example, the conventional control chip needs 19 pins used for connecting the HDMI connector. Therefore, regarding the conventional control chip in the HDMI sink device, it would have one dedicated input pin connected to the $18^{th}$ pin of the HDMI connector for receiving a +5V power signal generated from the HDMI source device, and one dedicated output pin connected to the $19^{th}$ pin of the HDMI connector for outputting a control signal to the HDMI source device for controlling hot plug detection (HPD).

In a case where an HDMI device is equipped with more than one HDMI connector, the pin count of the conventional control chip is large. If the conventional control chip is also required to support more functions, the pin count of the conventional control chip has to be increased; otherwise, the conventional control chip may not have enough input/output pins available for these functions. As a result, the package size and the production cost of the control chip are increased inevitably.

Thus, there is a need for an innovative control chip design with a reduced number of dedicated pins used for connecting pins of an HDMI connector.

SUMMARY

In accordance with exemplary embodiments of the present invention, a control chip for communicating with a wired connection interface by using a configurable pin selectively serving as an input pin (e.g., a pin used for receiving a power supply signal for connection detection) or an output pin (e.g., a pin used to output a control signal for controlling hot plug detection) is proposed to solve the above-mentioned problems.

According to a first aspect of the present invention, an exemplary control chip is disclosed. The exemplary control chip includes a configurable pin and a control logic. The configurable pin is arranged for coupling a first pin and a second pin of a wired connection interface. The control logic is arranged for controlling the configurable pin to switch between a first operation mode and a second operation mode. The configurable pin serves as an input pin configured for receiving a power supply signal when operating in the first operation mode, and the configurable pin serves as an output pin configured for outputting an output signal when operating in the second operation mode.

According to a second aspect of the present invention, an exemplary control chip is disclosed. The exemplary control chip includes a configurable pin and a control logic. The configurable pin is arranged for coupling a first pin and a second pin of a wired connection interface. The control logic is arranged for controlling the configurable pin to switch between a first operation mode and a second operation mode. The configurable pin serves as an input pin configured for receiving an input signal when operating in the first operation mode, and the configurable pin serves as an output pin configured for outputting a control signal for controlling hot plug detection (HPD) when operating in the second operation mode.

According to a third aspect of the present invention, an exemplary control chip is disclosed. The exemplary control chip includes a configurable pin and a control logic. The configurable pin is arranged for coupling a first pin and a second pin of a high-definition multimedia interface (HDMI) connector. The control logic is arranged for controlling the configurable pin to switch between a first operation mode and a second operation mode. The configurable pin serves as an input pin when operating in the first operation mode, and the configurable pin serves as an output pin when operating in the second operation mode.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a diagram illustrating an exemplary pin assignment of a conventional HDMI connector.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 2:
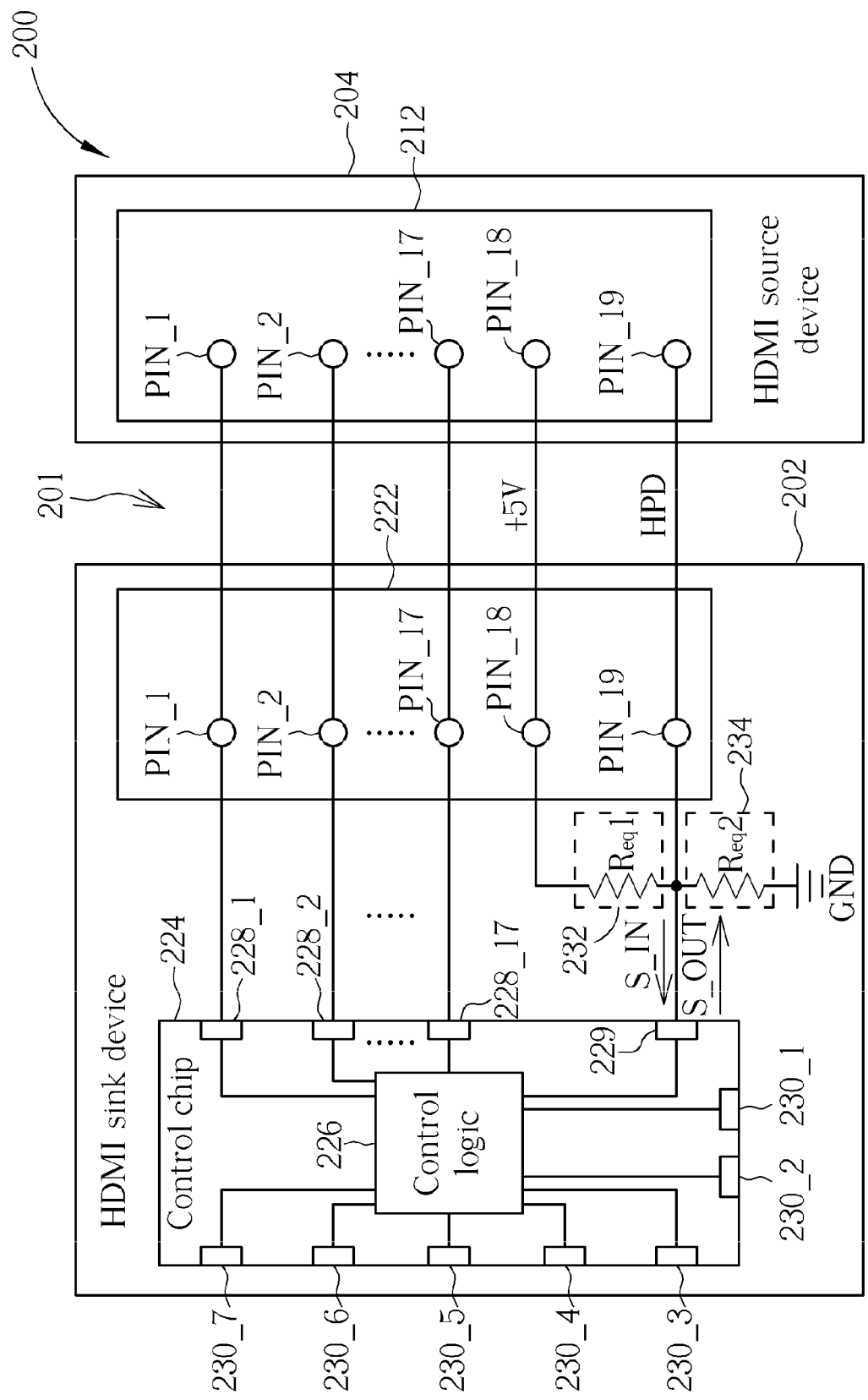
FIG. 2 is a diagram illustrating a multimedia system according to an exemplary embodiment of the present invention.

FIG. 2 is a diagram illustrating a multimedia system according to an exemplary embodiment of the present invention. The multimedia system 200 includes an HDMI sink device 202 (e.g., a video projector, a television, or a computer monitor) and an HDMI source device 204 (e.g., a set-top box, an optical disc player, a video game console, or a personal computer). The HDMI source device 204 has an HDMI connector (i.e., an HDMI port) 212, and the HDMI sink device 202 has an HDMI connector (i.e., an HDMI port) 222. By way of example, each of the HDMI connectors 212 and 222 has the aforementioned pin assignment shown in FIG. 1, and therefore includes 19 pins (i.e., PIN_1-PIN_19). Hence, the HDMI source device 204 communicates with the HDMI sink device 202 via an HDMI cable 201 having 19 wires connected between the HDMI connectors 212 and 222. As shown in FIG. 2, the HDMI sink device 202 further includes a control chip 224, which employs the pin sharing technique as proposed by the present invention. In this exemplary embodiment, the control chip 224 is part of an HDMI receiver, and includes a control logic 226, a plurality of first pins 228_1-228_17, a configurable pin 229, and a plurality of second pins 230_1-230_7. It should be noted that the number of pins shown in FIG. 2 is for illustrative purposes only, and is not meant to be a limitation of the present invention. Besides, each of the HDMI sink device 202 and HDMI source device 204 is allowed to have more than one HDMI connector, depending upon actual design consideration/requirement.

The first pins 228_1-228_17 and the configurable pin 229 are used by the HDMI function supported by the control logic 226. More specifically, the first pins 228_1-228_17 are dedicated pins used for coupling pins PIN_1-PIN_17 of the HDMI connector 222, respectively. Thus, first pins 228_1-228_17 and pins PIN_1-PIN_17 have a one-to-one mapping relationship. The configurable pin 229 is a dedicated pin used for coupling multiple pins PIN_18-PIN_19 of the HDMI connector 222. Hence, the configurable pin 229 and pins PIN_18-PIN_19 have a one-to-many mapping relationship. With regard to the second pins 230_1-230_7, they may include input/output pins used by other function(s) supported by the control logic 226.

The control logic 226 is arranged for controlling the configurable pin 229 to switch between a first operation mode and a second operation mode. In one exemplary design, the configurable pin 229 serves as an input pin configured for receiving an input signal S_IN (e.g., a power supply signal for connection detection) when operating in the first operation mode, and the configurable pin 229 serves as an output pin configured for outputting an output signal S_OUT (e.g., a control signal for controlling hot plug detection) when operating in the second operation mode. As shown in FIG. 2, a passive element 232 with an equivalent resistance value $R_{eq}1$ is coupled between pins PIN_18-PIN_19 to satisfy the requirement specified in the HDMI specification. For example, the equivalent resistance value $R_{eq}1$ is 1K ohms. Besides, to ensure that the control logic 226 can correctly detect connection of an external device (i.e., the HDMI source device 204) according to the logic level of the input signal S_IN, a passive element 234 acting as a pull-down resistor may be coupled between the last pin PIN_19 and the ground GND. When a +5V power signal is absent at pin PIN_18 of the HDMI connector 222, the passive element 234 would make the input signal S_IN have a logic low level near the ground voltage (i.e., 0V). Moreover, as shown in FIG. 2, the pin PIN_18 is indirectly connected to the configurable pin 229 through the passive element 232 rather than directly connected to the configurable pin 229. Preferably, the passive element 234 has an equivalent resistance value $R_{eq}2$ far greater than the equivalent resistance value $R_{eq}1$ (i.e., $R_{eq}2 \gg R_{eq}1$). For example, the passive element 234 is a high-impedance pull-down resistor. Hence, when a +5V power signal is actually present at pin PIN_18 of the HDMI connector 222 due to connection of an external device (i.e., the HDMI source device 204), the passive element 234 makes the input signal S_IN have a logic high level near +5V. However, as the passive element 234 is not specified in the HDMI specification, it may be optional. Therefore, in an alternative design of the HDMI sink device 202, the passive element 234 may be omitted without departing from the spirit of the present invention. Further details directed to switching the configurable pin 229 between the first operation mode and the second operation mode are described as below.

Figure 3:
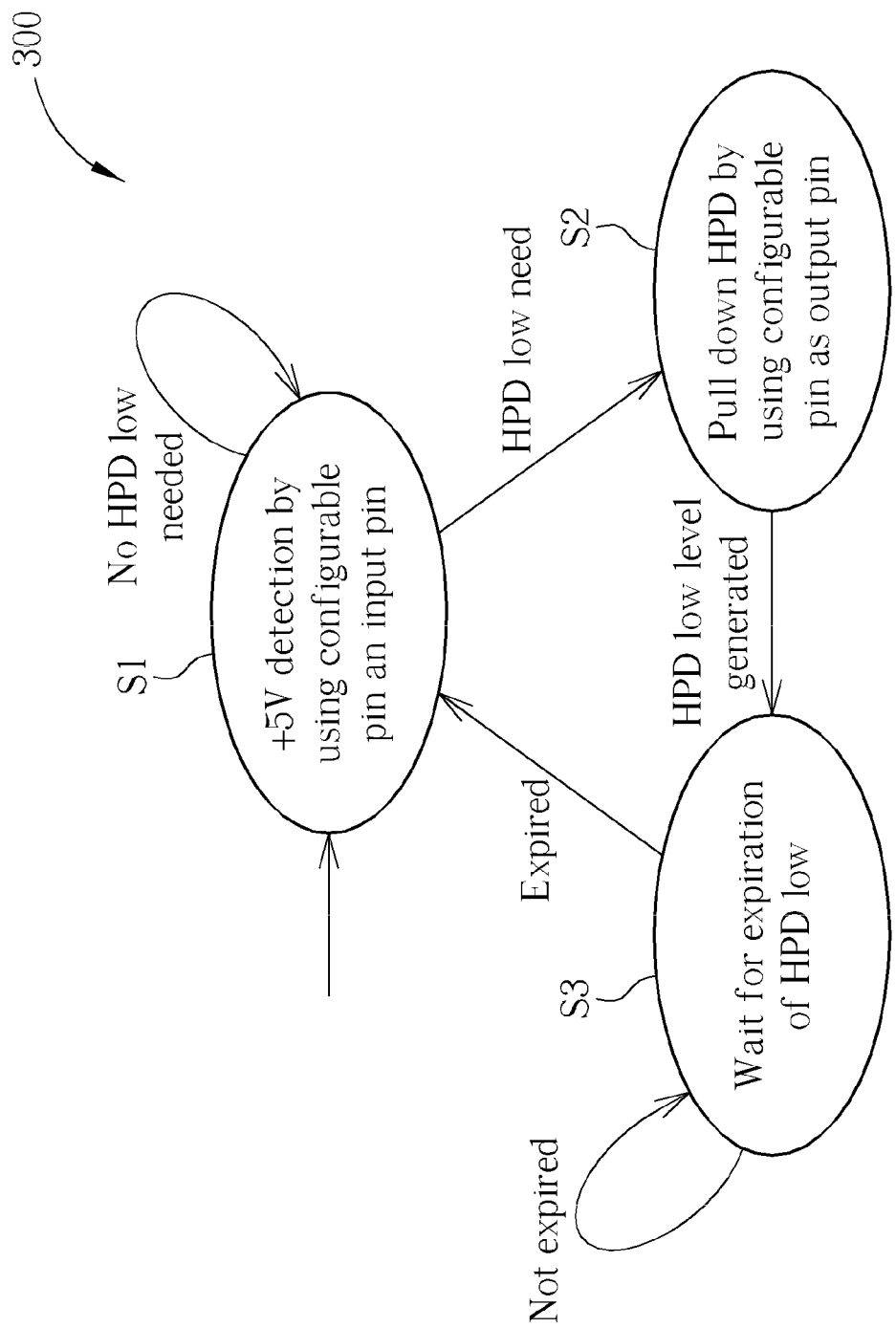
FIG. 3 is a diagram illustrating an exemplary finite state machine employed by a control logic shown in FIG. 2.

FIG. 3 is a diagram illustrating an exemplary finite state machine employed by the control logic 226 shown in FIG. 2. The operation of switching the configurable pin 229 between the first operation mode and the second operation mode may be realized by firmware control or hardware control. The exemplary finite state machine 300 includes three states S1, S2 and S3. Initially, the control logic 226 enters the state S1, and therefore performs connection detection by making the configurable pin 229 operate in the first operation mode to serve as an input pin. When the HDMI source device 204 is not connected to the HDMI sink device 202 yet, the pin PIN_18 of the HDMI connector 222 does not receive a +5V power signal supplied from an external device (i.e., the HDMI source device 204), and the input signal S_IN would have a logic low level (e.g., 0V) due to the passive element 234 coupled to the ground GND.

When the HDMI source device 204 is connected to the HDMI sink device 202 via the HDMI cable 201, the pin PIN_18 of the HDMI connector 222 is connected to the pin PIN_18 of the HDMI connector 212, and receives a +5V power signal supplied from the HDMI source device 204. It should be noted that the passive elements 232 and 234 act as a voltage divider, and the equivalent resistance value $R_{eq}2$ is far greater than the equivalent resistance value $R_{eq}1$. Hence, the input signal S_IN would be a power supply signal have a predetermined voltage $$\left(e.g., +5\ V * \frac{R_{eq}2}{R_{eq}1 + R_{eq}2} \cong +5\ V\ \text{if}\ R_{eq}2 \gg R_{eq}1\right)$$

generated from the voltage divider. That is, the input signal S_IN has a logic high level now. The control logic 226 determines that the HDMI source device 204 is connected to the HDMI sink device 202 upon detecting the logic high level of the input signal S_IN. In addition, as pin PIN_19 of the HDMI connector 222 is coupled to pin PIN_18 of the HDMI connector 222 via the passive element 232, and connected to the pin PIN_19 of the HDMI connector 212 via the HDMI cable 201, an HPD signal would have a transition from a logic low level to a logic high level due to the +5V power signal, and the HPD signal with a logic high level is fed back to the HDMI source device 204 for informing the HDMI source device 204 of the connection of HDMI sink device 202.

When the HDMI source device 204 is disconnected from the HDMI sink device 202, the supply of the +5V power signal is cut off, thus making the input signal S_IN have a transition from the logic high level to the logic low level. Therefore, the control logic 226 determines that the HDMI source device 204 is not connected to the HDMI sink device 202 upon detecting the logic low level of the input signal S_IN. Besides, as the supply of the +5V power signal is cut off, the HPD signal would also have a transition from the logic high level to the logic low level correspondingly. In this way, the HDMI source device 204 is informed of the disconnection of HDMI sink device 202.

As mentioned above, when the control logic 226 stays in the state S1 and the HDMI source device 204 is connected to the HDMI sink device 202, the HPD signal would have a logic high level due to the +5V power signal. However, under certain conditions, the HDMI sink device 202 may actively pull the HPD signal from the logic high level to the logic low level to thereby force the HDMI source device 204 to perform re-connection or new hand-shaking procedure with the HDMI sink device 202. In a case where the HDMI sink device 202 does not need to pull down the HPD signal when the HDMI source device 204 remains connected to the HDMI sink device 202, the control logic 226 keeps staying in the state S1. In another case where the HDMI sink device 202 needs to pull down the HPD signal when the HDMI source device 204 remains connected to the HDMI sink device 202, the control logic 226 leaves the current state S1 and enters the next state S2.

After entering the state S2, the control logic 226 is operative to make the configurable pin 229 operate in the second operation mode to serve as an output pin. Next, the control logic 226 generates the output signal S_OUT to the pin PIN_19 of the HDMI connector 222, where the output signal S_OUT acts as a control signal for controlling the hot plug detection, and has a transition from a logic high level to a logic low level for pulling down the HPD signal received by the HDMI source device 204.

After the output signal S_OUT is generated, the control logic 226 leaves the current state S2 and enters the next state S3. In accordance with the HDMI specification, to make the HDMI source device 204 perform re-connection or new hand-shaking procedure with the HDMI sink device 202, the HPD signal with a transition from the logic high level to the logic low level should be kept at the logic low level for a time period not shorter than a threshold (e.g., 100 ms). Therefore, after entering the state S3, the control logic 226 is operative to count a predetermined time period, where the predetermined time period (e.g., 500 ms) is not shorter than the threshold. Before the predetermined time period expires, the control logic 226 keeps staying in the state S3 to wait for expiration of forcing the HPD signal to remain at the logic low level. When the predetermined time period expires, the control logic 226 leaves the current state S3 and enters the next state S1 (i.e., a default state), and switches the configurable pin 229 from the second operation mode to the first operation mode. To put is simply, the control logic 226 does not leave the state S3 until the HPD signal has the logic low level lasting for the predetermined time period.

In above exemplary embodiment, the pin sharing technique is applied to the control chip 224 in the HDMI sink device 202 for controlling the configurable pin 229 to selectively serve as an input pin corresponding to the pin PIN_18 of the HDMI connector 222 or an output pin corresponding to the pin PIN_19 of the HDMI connector 222. However, this is for illustrative purposes only, and is not meant to be a limitation of the present invention. That is, a control chip employing the proposed pin sharing technique may be applied to a wired communication interface different from the HDMI interface. Besides, a configurable pin of the proposed control chip may be coupled to a plurality of pins of the wired communication interface, where these pins may include a first pin used for receiving a power signal and/or a second pin used for outputting an HPD signal.

Figure 4:
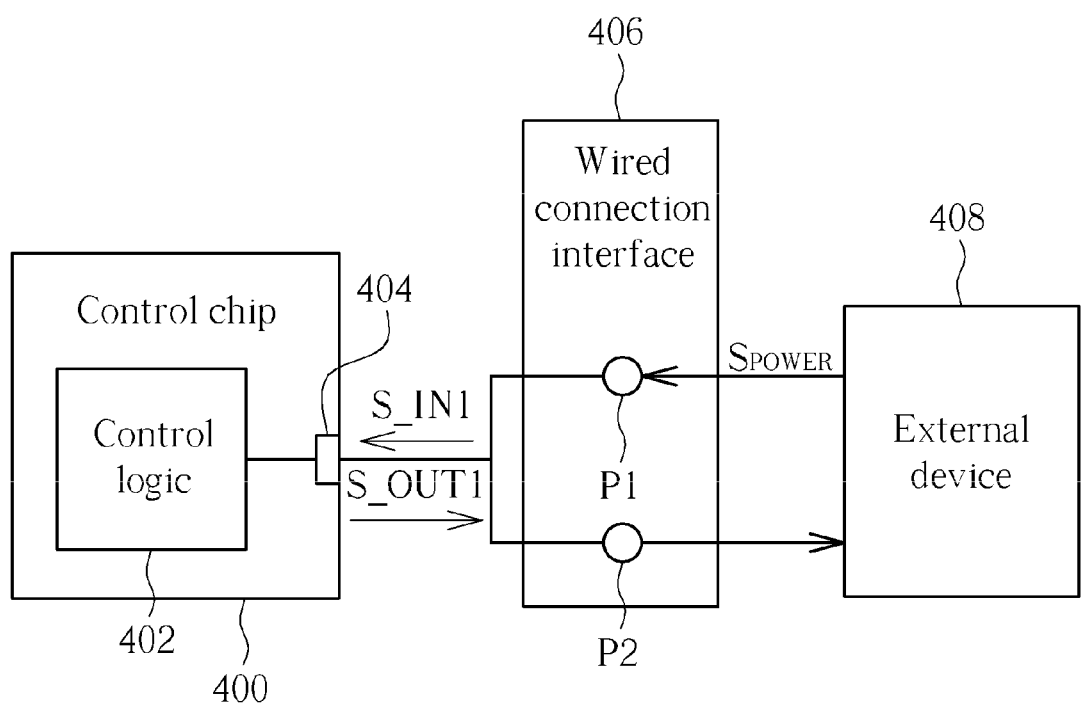
FIG. 4 is a diagram illustrating a generalized control chip employing the proposed pin sharing technique according to a first alternative design of the present invention.

Please refer to FIG. 4, which is a diagram illustrating a first generalized alternative implementation of a control chip employing the proposed pin sharing technique according to the present invention. The control chip 400 includes a control logic 402 and a configurable pin 404. The configurable pin 404 is coupled to a first pin P1 and a second pin P2 of a wired connection interface 406. The control logic 402 is arranged for controlling the configurable pin 404 to switch between a first operation mode and a second operation mode. The configurable pin 404 serves as an input pin configured for receiving a power supply signal S_IN1 with a predetermined voltage when operating in the first operation mode. In this embodiment, the power supply signal S_IN1 is derived from an external power supply signal $S_{POWER}$ generated from an external device 408 connected to the wired connection interface 406 via any wired connection means. The configurable pin 404 serves as an output pin configured for outputting an output signal S_OUT1 when operating in the second operation mode, where the output signal S_OUT1 is not necessary to be the aforementioned HPD signal.

Figure 5:
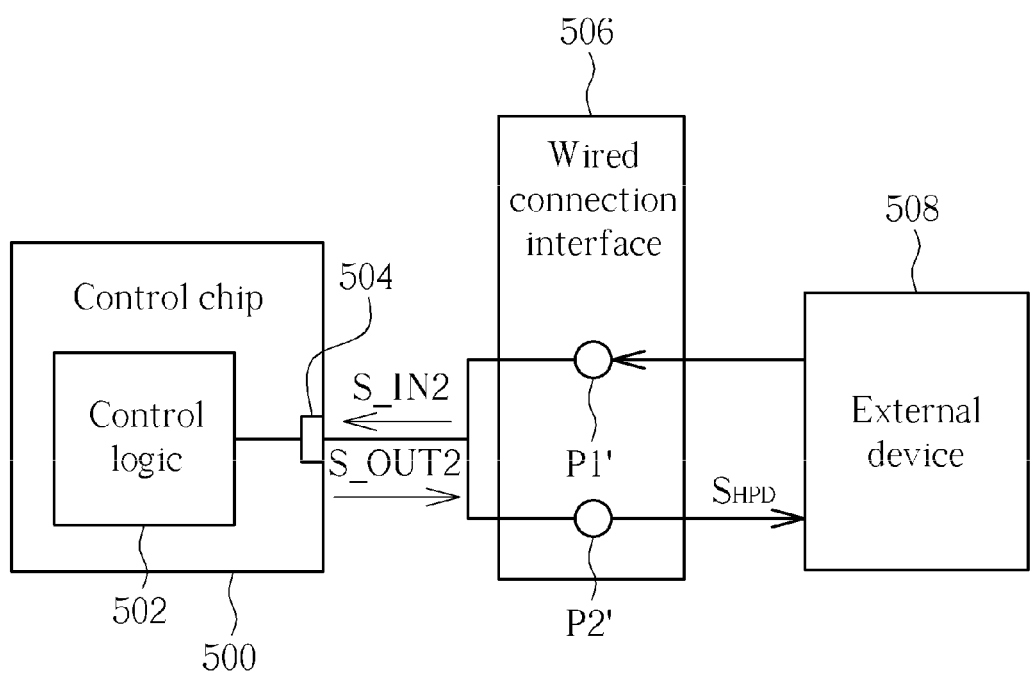
FIG. 5 is a diagram illustrating a generalized control chip employing the proposed pin sharing technique according to a second alternative design of the present invention.

Please refer to FIG. 5, which is a diagram illustrating a second generalized alternative implementation of a control chip employing the proposed pin sharing technique according to the present invention. The control chip 500 includes a control logic 502 and a configurable pin 504. The configurable pin 504 is coupled to a first pin P1' and a second pin P2' of a wired connection interface 506. The control logic 502 is arranged for controlling the configurable pin 504 to switch between a first operation mode and a second operation mode. The configurable pin 504 serves as an input pin configured for receiving an input signal S_IN2 when operating in the first operation mode, where the input signal S_IN2 is not necessary to be derived from the aforementioned power supply signal (e.g., +5V power signal) supplied from the external device 508. The configurable pin 504 serves as an output pin configured for outputting an output signal S_OUT2 to the second pin P2' for controlling hot plug detection when operating in the second operation mode, where an HPD signal is derived from the output signal S_OUT2 and transmitted to the external device 508 connected to the wired connection interface 506 via any wired connection means.

As can be seen from FIG. 2, FIG. 4 and FIG. 5, one configurable pin of the control chip is coupled to a plurality of pins of a wired connection interface (e.g., an HDMI connector). Compared to the conventional control chip design, the proposed control chip design has a reduced pin count. In a case where the control chip is coupled to a single wired connection interface, one pin of the control chip is saved by using the proposed pin sharing technique. In another case where the control chip is coupled to a plurality of wired connection interfaces, more pins of the control chip are saved by using the proposed pin sharing technique. As the pin count of the control chip is reduced, the package size and the production cost of the control chip are reduced. Besides, if the control chip is designed to support more functions, the saved pins may be assigned to these functions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control chip, comprising:
a configurable pin, arranged for coupling to an external power pin and an external hot plug detect pin of a wired connection interface; and
a control logic, arranged for controlling the configurable pin to switch between a first operation mode and a second operation mode;
wherein the configurable pin serves as an input pin configured for receiving a power supply signal through the external power pin when operating in the first operation mode, and the configurable pin serves as an output pin configured for outputting a hot plug detection (HPD) signal through the external hot plug detect pin when operating in the second operation mode, the external power pin is coupled to the external hot plug detect pin via a first passive element, and the external hot plug detect pin is coupled to ground via a second passive element.

2. The control chip of claim 1, wherein the power supply signal is derived from an external power supply signal received by the first pin.

3. The control chip of claim 1, wherein the control logic checks the power supply signal for detecting whether an external device is connected to the wired connection interface.

4. The control chip of claim 1, wherein the power supply signal has a first predetermined voltage, and the output signal has a second predetermined voltage different from the first predetermined voltage.

5. The control chip of claim 4, wherein the second predetermined voltage is lower than the first predetermined voltage.

6. The control chip of claim 1, wherein the control logic initially makes the configurable pin operate in the first operation mode to serve as the input pin.

7. The control chip of claim 1, wherein the control logic counts a predetermined time period after making the configurable pin operate in the second operation mode to serve as the output pin, and when the predetermined time period expires, the control logic switches the configurable pin from the second operation mode to the first operation mode.

8. The control chip of claim 1, wherein the wired connection interface is a high-definition multimedia interface (HDMI) connector.

9. The control chip of claim 8, wherein the control chip and the HDMI connector are disposed in an HDMI sink device.

10. A control chip, comprising:
a configurable pin, arranged for coupling an external power pin and an external hot plug detect pin of a wired connection interface; and
a control logic, arranged for controlling the configurable pin to switch between a first operation mode and a second operation mode;
wherein the configurable pin serves as an input pin configured for receiving a power supply signal through the external power pin when operating in the first operation mode for detecting an external device, and the configurable pin serves as an output pin configured for outputting a control signal through the external hot plug detect pin for controlling hot plug detection (HPD) when operating in the second operation mode, the external power pin is coupled to the external hot plug detect pin via a first passive element, and the external hot plug detect pin is coupled to ground via a second passive element.

11. The control chip of claim 10, wherein the control logic checks the power supply signal for detecting whether the external device is connected to the wired connection interface.

12. The control chip of claim 10, wherein the control logic initially makes the configurable pin operate in the first operation mode to serve as the input pin.

13. The control chip of claim 10, wherein the control logic counts a predetermined time period after making the configurable pin operate in the second operation mode to serve as the output pin, and when the predetermined time period expires, the control logic switches the configurable pin from the second operation mode to the first operation mode.

14. The control chip of claim 10, wherein the wired connection interface is a high-definition multimedia interface (HDMI) connector.

15. The control chip of claim 14, wherein the control chip and the HDMI connector are disposed in an HDMI sink device.

16. A control chip, comprising:
a configurable pin, arranged for coupling an external power pin and an external hot plug detect pin of a high-definition multimedia interface (HDMI) connector; and
a control logic, arranged for controlling the configurable pin to switch between a first operation mode and a second operation mode;
wherein the configurable pin serves as an input pin when operating in the first operation mode, and the configurable pin serves as an output pin when operating in the second operation mode, wherein the input pin is arranged for receiving a power supply signal derived from a +5V power signal received by the external power pin, and the output pin is arranged for outputting a control signal to the external hot plug detect pin for controlling hot plug detection (HPD), the external power pin is coupled to the external hot plug detect pin via a first passive element, and the external hot plug detect pin is coupled to ground via a second passive element.

17. The control chip of claim 16, wherein the control logic initially makes the configurable pin operate in the first operation mode to serve as the input pin.

18. The control chip of claim 16, wherein the control logic counts a predetermined time period after making the configurable pin operate in the second operation mode to serve as the output pin, and when the predetermined time period expires, the control logic switches the configurable pin from the second operation mode to the first operation mode.

19. The control chip of claim 16, wherein the control chip and the HDMI connector are disposed in an HDMI sink device.

20. The control chip of any one of claim 1, wherein the first passive element and the second passive element act as a voltage divider, and the equivalent resistance value of the second passive element is far greater than the equivalent resistance value of the first passive element.

* * * * *